US008350750B2

(12) United States Patent
Paek et al.

(10) Patent No.: US 8,350,750 B2
(45) Date of Patent: Jan. 8, 2013

(54) DISTRIBUTED TIME-REVERSAL MIRROR ARRAY

(75) Inventors: Eung Gi Paek, Germantown, MD (US); Joon Y Choe, Potomac, MD (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 261 days.

(21) Appl. No.: 12/948,841

(22) Filed: Nov. 18, 2010

(65) Prior Publication Data
US 2012/0127020 A1 May 24, 2012

(51) Int. Cl.
*G01S 13/89* (2006.01)
(52) U.S. Cl. ............ 342/103; 342/25 E; 342/25 F; 342/125; 342/179
(58) Field of Classification Search ............... 342/25 R, 342/25 A–25 C, 25 E–25 F, 90, 95–97, 103, 342/125, 139–140, 146–148, 179, 195
See application file for complete search history.

(56) References Cited

U.S. PATENT DOCUMENTS

| 5,331,964 | A  | * | 7/1994 | Trahey et al. | .................. 600/447 |
| 7,535,409 | B1 | * | 5/2009 | Choe et al. | .................... 342/159 |
| 7,876,261 | B1 | * | 1/2011 | Adams | ............................ 342/88 |
| 8,264,397 | B2 | * | 9/2012 | Paek et al. | ........................ 342/31 |
| 2006/0098746 | A1 | * | 5/2006 | Candy et al. | ................... 375/259 |
| 2012/0098697 | A1 | * | 4/2012 | Paek et al. | ..................... 342/174 |
| 2012/0127020 | A1 | * | 5/2012 | Paek et al. | ..................... 342/103 |

OTHER PUBLICATIONS

Hodgkiss, W.S.; Skinner, J.D.; Edmonds, G.E.; Harriss, R.A.; Ensberg, D.E.; , "A high frequency phase conjugation array," Oceans, 2001. MTS/IEEE Conference and Exhibition , vol. 3, No., pp. 1581-1585 vol. 3, 2001.*

Fink, M.; Prada, C.; Wu, F.; Cassereau, D.; , "Self focusing in inhomogeneous media with time reversal acoustic mirrors," Ultrasonics Symposium, 1989. Proceedings., IEEE 1989 , vol., No., pp. 681-686 vol. 2, Oct. 3-6, 1989.*
Parihar, D.P.S.; Agarwal, A.; Agrawal, M.; , "Time reversal mirror: Temporal and spatial focusing tool," Oceans 2010 IEEE—Sydney , vol., No., pp. 1-7, May 24-27, 2010.*
U.S. Appl. No. 12/911,817, Paek et al.
Mathias Fink, "Time-Reversed Acoustics," Scientific American pp. 91-97 (Nov. 1999).
T.E. Derham, S. Doughty, K. Woodbridge and C.J. Baker, "Design and evaluation of a low-cost multistatic netted radar system," Radar, Sonar & Navigation, IET, vol. 1, Issue 5, pp. 362-368 (Oct. 2007).

* cited by examiner

*Primary Examiner* — John B Sotomayor
(74) *Attorney, Agent, or Firm* — Amy L. Ressing; L. George Legg (57) ABSTRACT

A distributed time reversal mirror array (DTRMA) system includes a plurality of independent, sparsely distributed time reversal mirrors (TRMs). Each of the TRMs includes an antenna; a transceiver connected to the antenna for transmitting a signal toward a target, for receiving a return, reflected signal from the target, and for retransmitting a time-reversed signal toward the target: means for phase-locking and for maintaining spatial and temporal coherences between the TRMs; and a computer including a machine-readable storage media having programmed instructions stored thereon for computing and generating the time-reversed retransmitted signal, thereby providing a phased array functionality for the DTRMA while minimizing distortion from external sources. The DTRMA is capable of operating in an autonomous, unattended, and passive state, owing to the time-reversal's self-focusing feature. The beam may be sharply focused on the target due to the coherently synthesized extended aperture over the entire array.

5 Claims, 13 Drawing Sheets

DISTRIBUTED TIME-REVERSAL MIRROR ARRAY

CROSS-REFERENCE TO RELATED APPLICATIONS

The present application is related to U.S. patent application Ser. No. 12/911,817, filed Oct. 26, 2010.

FIELD OF THE INVENTION

The invention is directed to a distributed time reversal mirror array (DTRMA) system employing a plurality of independent, sparsely distributed time reversal mirrors (TRMs), and more particularly to a DTRMA that is capable of operating in an autonomous, unattended, and passive state.

BACKGROUND OF THE INVENTION

Time-reversal has several powerful features that make it highly desirable for coherent radar imaging and tracking. These features include adaptive self-focusing of a beam on a target through distorting media, and high resolution imaging due to multipath-enabled extended virtual aperture. However, its implementation at high frequency over-the-horizon-radar (HF-OTHR), e.g. as described in J. F. Thomason, "Development of Over-the-Horizon Radar in the United States," IEEE Radar 2003 Conference, Adelaide. Australia, pp 599-601 (Sep. 3-5, 2003) and J. M. Headrick, "HF Over-The-Horizon Radar," Radar Handbook, 2d ed., Ch. 24. McGraw Hill Book (1990), is hampered by the required long RF cables which can raise various issues such as signal attenuation, phase instability due to thermal expansion, and difficulties in installation. If each element of HF-OTHR can be separate, independent, and modularized, its time-reversal implementation over a very large area can be greatly facilitated, significantly improving the performance.

Netted radars, such as WSN (wireless sensor network) are described in T. E. Derham, K. Woodbridge, H. Grifiths and C. J. Baker, "The design and development of an experimental netted radar system," Radar Conference, Proceedings of the International, pp 293-98 (3-5 Sep. 2003) ("Derham 1") and T. E. Derham. S. Doughty. K. Woodbridge and C. J. Baker, "Design and evaluation of a low-cost multistatic netted radar system," Radar, Sonar & Navigation, IET, Vol. 1, Issue 5. pp. 362-68 (October 2007) ("Derham 2"), do not exhibit coherent integration of unwired remote radars both temporally and spatially.

Temporal coherence can be attained with current technology, e.g. as described in D. Trizna, and Lillian (Xialon) Xu, "Target Classification and Remote Sensing of Ocean Current Shear Using a Dual-Use Multifrequency HF Radar," IEEE J. of Oceanic Eng. Vol. 31, No. 4, pp. 904-918 (October 2006) ("Trizna et al.") using a GPS-disciplined Rubidium clock. However, spatial coherence with sub nsec (<0.2 nsec) synchronization among distributed sensors has proven difficult. The demonstrated coherent netted radar system to date (e.g. Deram 1 and Derham 2, supra) are "hard-wired" to meet the stringent requirements of coherence and synchronization.

BRIEF SUMMARY OF THE INVENTION

According to the invention, a distributed time reversal mirror array (DTRMA) system includes a plurality of independent, sparsely distributed time reversal mirrors (TRMs). Each of the TRMs includes an antenna; a transceiver connected to the antenna for transmitting a signal toward a target, for receiving a return, reflected signal from the target, and for retransmitting a time-reversed signal toward the target; means for phase-locking and for maintaining spatial and temporal coherences between the TRMs; and a computer including a machine-readable storage media having programmed instructions stored thereon for computing and generating the time-reversed retransmitted signal, thereby providing a phased array functionality for the DTRMA while minimizing distortion from external sources.

The developed concepts in this invention may be applied to any coherent multistatic radars.

The invention has several advantages over the conventional phased array antennas, especially for high frequency OTHR cases. It provides time-reversal-based adaptive self-focusing of a beam on a target through distorting media to allow efficient target tracking. The invention also provides time-reversal-based multipath-enabled extended virtual aperture for high resolution beam focusing beyond the diffraction limit. It is cable-free, has easy and quick installation, and can be almost anywhere in a 2D or 3D arrangement. Also, it is scalable to a large array due to the easy installation of the modular, individual TRM. Furthermore, it has good SNR and SCR due to its good resolution.

Another significant advantage of the DTRMA is its capability of operating in an autonomous, unattended, and passive state, owing to the time-reversal's self-focusing feature. The beam may be sharply focused on the target due to the coherently synthesized extended aperture over the entire array.

DETAILED DESCRIPTION OF THE INVENTION

Figure 1:
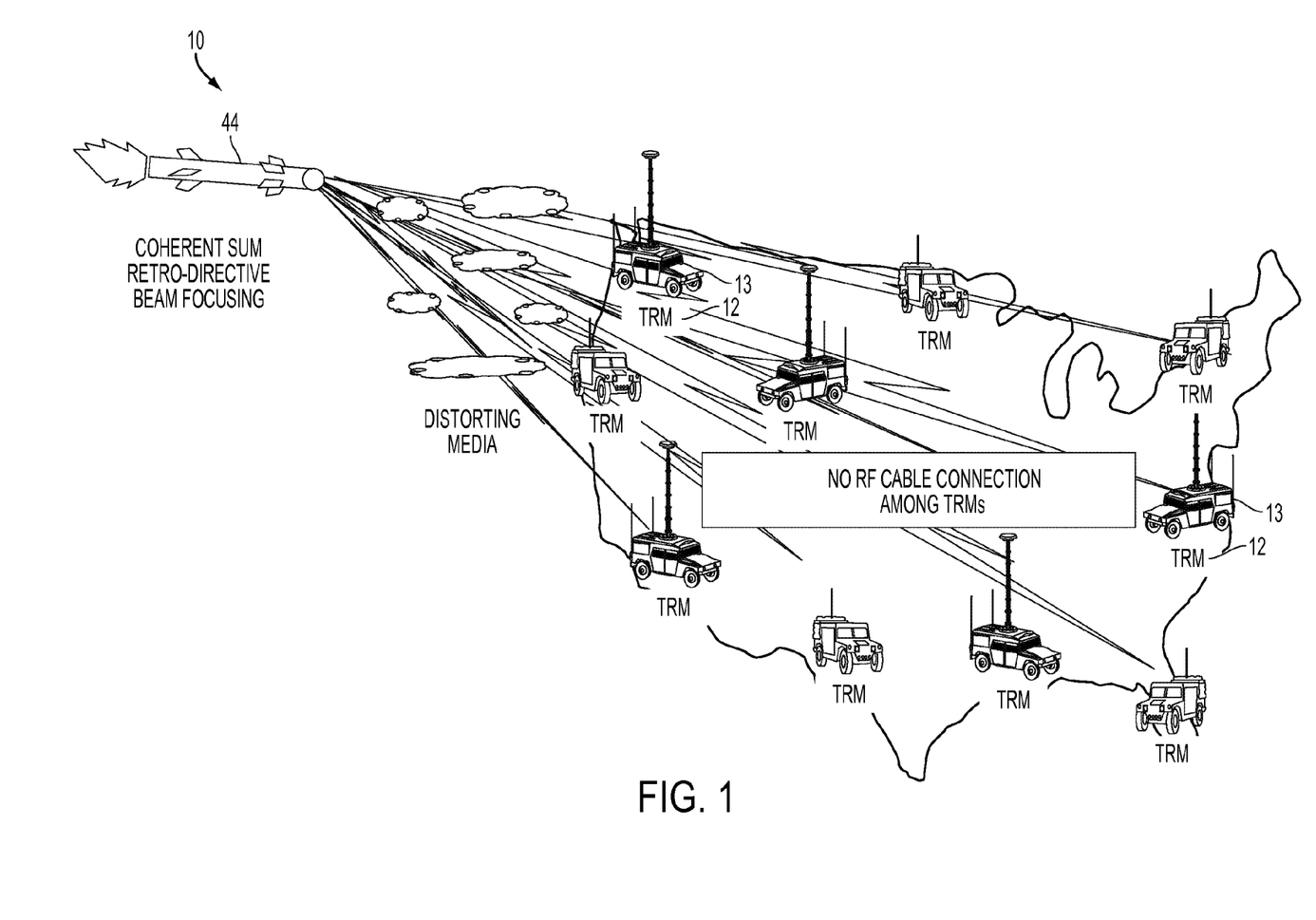
FIG. 1 is a distributed time-reversal mirror array (DTRMA) according to the invention.
Figure 2:
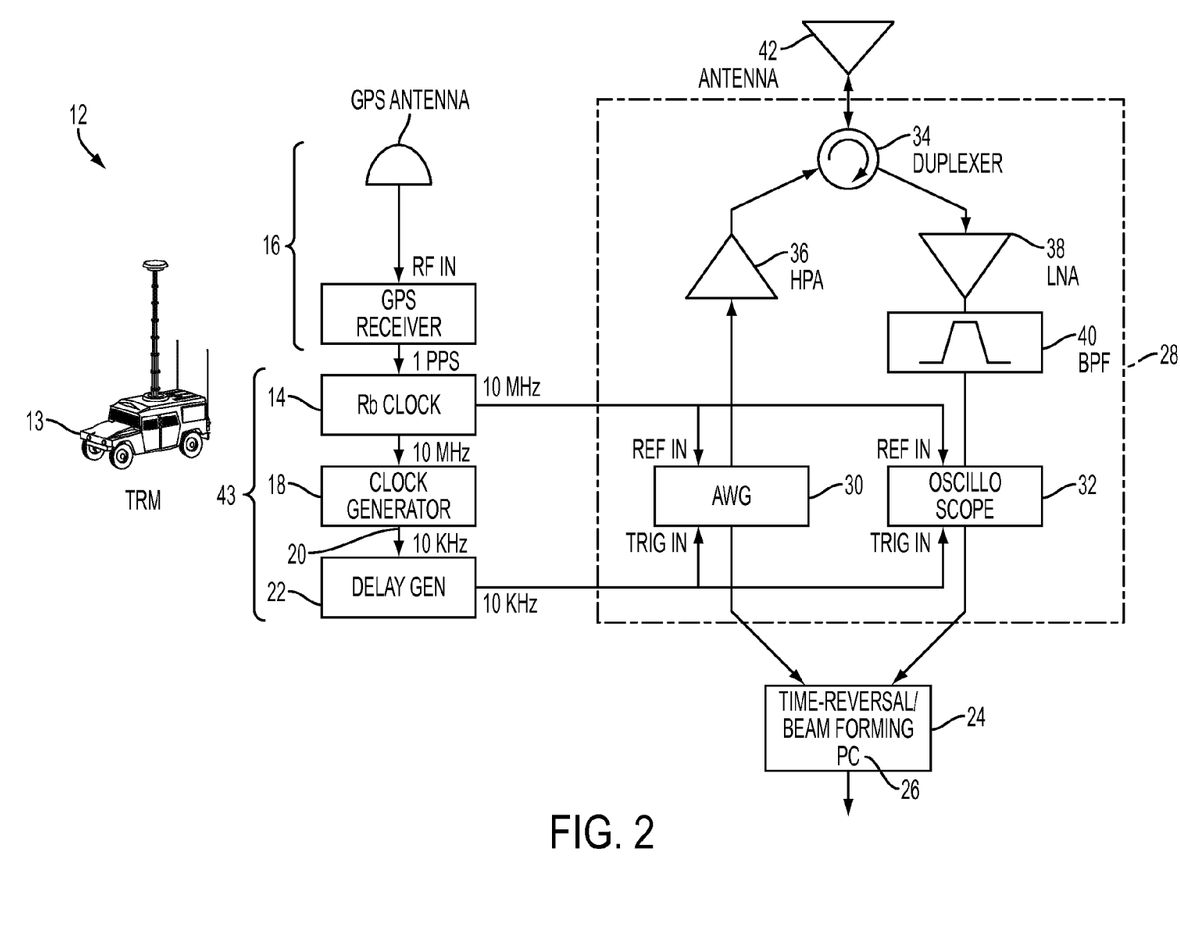
FIG. 2 is an individual time reversal mirror (TRM) according to the invention.

Referring now to FIGS. 1 and 2, in one embodiment of the invention a distributed time reversal mirror array (DTRMA) 10 consists of a plurality of independent, separate time reversal mirrors (TRMs) 12 that are distributed sparsely and randomly over a large area in a two-dimensional or three-dimensional arrangement conformal to a selected territory. For example, a TRM 12 may be positioned in a mobile vehicle 13 as shown, although one or more may also be located in designated fixed positions if desired. The TRMs 12 are phase-locked with each other with the aid of a high-stability Rubidium (Rb) clock 14 and a global positioning system (GPS) 16. A phase-locked clock generator 18 (e.g. SRS, CG635) generates a sub-nsec precision synchronous trigger signal 20 to maintain both spatial and temporal coherences among TRMs 12 so that the entire array 10 can function as a large phased array antenna. Trizna et al. supra, describes obtaining temporal coherence using commercially available GPS-disciplined Rb clocks. Each TRIM 12 repeats itself a simple procedure comprising of three stages—detection, time-reversal and re-transmission—at a pre-defined pulse repetition frequency (prf) in a synchronous manner. Due to time-reversal, coherent integration is achieved through distorting media without relying on complicated array calibration or geo-location processes.

FIG. 2 shows an embodiment of a TRM 12 that, in addition to the Rb clock 14 and clock generator 18, consists of a delay generator 22 (e.g. SRS DG535), a computer 24 including a machine-readable storage media 26 having programmed instructions stored thereon for computing and generating the time-reversed signal and for processing and outputting a resulting beamformed signal, and a conventional radio transceiver 28, which typically consists of an arbitrary waveform generator (AWG) 30, an oscilloscope (OSC) 32, a duplexer 34, a high power amplifier (HPA) 36, a low noise amplifier (LNA) 38, and a bandpass filter (BPF) 40, with signals transmitted and received via antenna 42. A clock circuit 43 includes the Rb clock 14 for generating a precision 10 MHz time-base signal to phase-lock all the instruments locally, the clock generator 18 to generate a square wave to trigger both the AWG 30 and OSC 32 after a suitable amount of delay generated by the delay generator 22. Spatial coherence among TRMs 12 is achieved by the phase-locking of reference signals and synchronization of triggering signals that trigger both the OSC 32 and the AWG 30 locally. The OSC 32 is used here as an alternative to an analog-to-digital converter (ADC) to digitize incoming signals. The signal is then time-reversed by the computer 24, and the waveform is loaded on the AWG 30. At each trigger signal at a given period, the AWG 30 emits the time-reversed waveform. Constant temporal skew of trigger signals among TRMs 12 is compensated by the digital delay generator 22. This aligns the trigger signal at the TRM 12. This is a fixed delay and so is necessary only when a new TRM 12 is installed at a given location or vehicle 13.

Temporal coherence is achieved by commercially available GPS-disciplined Rubidium clocks, as has been demonstrated in Trizna et al, supra. Spatial coherence among TRMs 12 is achieved by the phase-locking of reference signals and synchronization of triggering signals that trigger both oscilloscope (ADC) and AWG locally. The trigger signal at a pre-designated pulse repetition frequency (prf) is locally generated using a precision synthesized clock generator (e.g. SRS, CG635) which is phase-locked to the 10 MHz time-base from the local GPS-Rb clock. Special care must be taken to ensure that the TTL trigger signal is clean and free from glitches or ripples.

To achieve spatial coherence among sensors within sub nsec (or approx. several % of a period) synchronization is an issue. The desired precision is achieved by employing the precision synthesized clock generator 18 which is phase-locked to the 10 MHz time-base from the GPS-Rb clock, as described previously. Furthermore, time-reversal compensates for the additional skew arising from the locations of TRMs, as described below.

Figure 3:
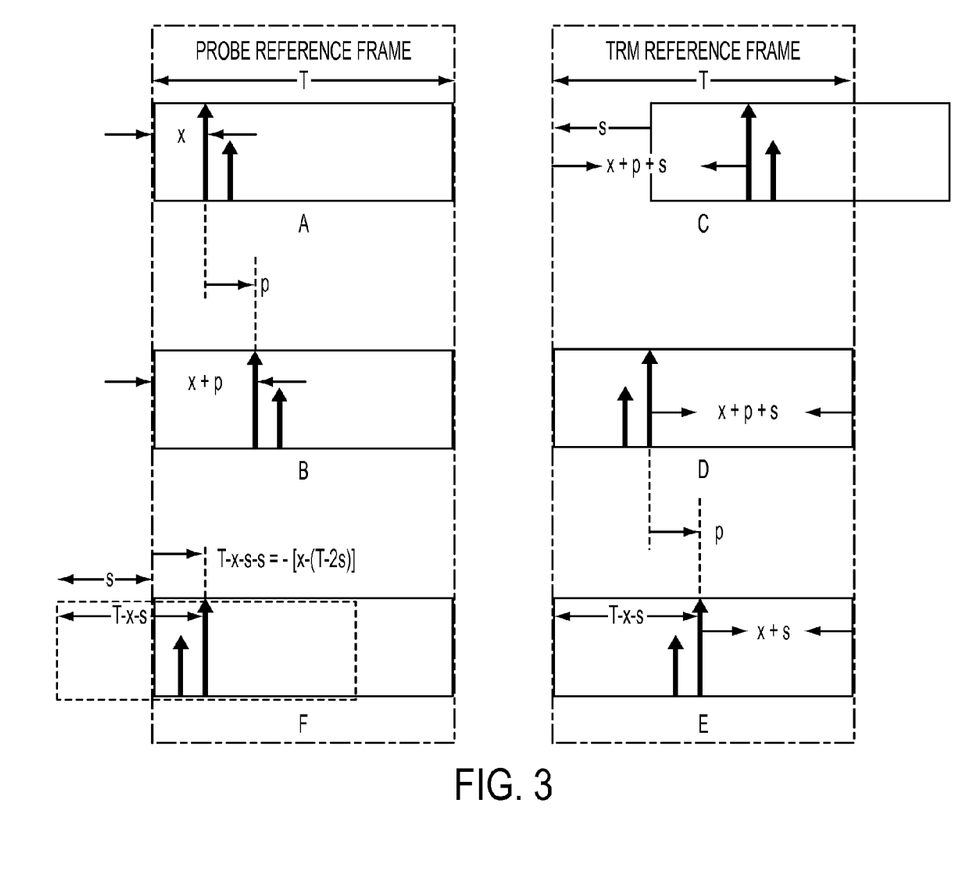
FIG. 3 shows the timing relationship of a signal waveform measured on a Probe (left) and TRM (right) stations according to the invention.

FIG. 3 shows a signal waveform measured on the Probe (left) and IRM (right) stations, and that the amount of time-delay after round-trip and time-reversal is independent of propagation delay p (or the location of TRMs). Once the trigger skew among nodes is compensated, there is no further need to re-adjust it, even after a TRM 12 is moved to a different location. This unique feature due to time-reversal allows mobile operation of the DTRMA 10. More particularly, initially a pulse is generated by the Probe station at t=x, measured from the start (e.g. rising edge) of the trigger signal at Probe station, as shown in FIG. 3A. When the pulse arrives at the TRM, it will be delayed by p (p=d/c, where d is the distance between the two nodes and c is the velocity of light).

If the delayed signal were to be measured at the Probe station's oscilloscope, it would have looked like that shown in FIG. 3B. However, when there is a time skew between the trigger signals at the two stations, the waveform will be shifted accordingly. Assuming that the trigger signal of the TRM "leads" that of the probe by s, the pulse will appear at x+s+p on the oscilloscope at the TRM (FIG. 3C). After time-reversal, the pulse is located at x+s+p when measured from the end (right edge) of the frame, or T−(x+s+p) when measured from the start (left edge) of the frame, where T represents the period of the frame (or record length in time) (FIG. 3D). The time-reversed waveform is loaded on the AWG and is re-transmitted to the Probe station. If the delayed signal were to be measured at the TRM's oscilloscope, it would have looked like that shown in FIG. 3E after delay p. However, since the trigger signal at Probe station "lags" that of TRM by s, the pulse at the Probe station will be at T−x−2s=−{x−(T−2s)} on the oscilloscope at the Probe station (FIG. 3F). In other words, the time-reversed waveform is shifted by T−2s.

One should note that this delay T−2s is independent of propagation delay p even through distorting media (as long as the propagation characteristics is reciprocal) since it is canceled out after round trip and the time reversal process. However, the effect of the time skew between the trigger signals of the two stations are doubled. Therefore, the amount of the trigger skew at each TRM must be cancelled out using a delay generator. However, once compensated, there are no further need to re-adjust the trigger skew even after the TRM is re-positioned at different locations. This unique feature due to time-reversal provides spatial coherence among randomly distributed TRMs and permits mobile operation of the DTRMA 10.

Therefore, coherent integration of signals from distributed sensors is achieved notwithstanding a distorting media and without necessitating array calibration or the application of geo-location processes.

Operation of a DTRMA 10

The operational procedure of each TRM 12 is individual and repetitive at a pre-designated prf, while still maintaining coherence and synchronism across the entire array, as follows:

Initially an unfocused broad probe beam is generated by one or several TRMs 12. The probe beam illuminates a broad area of interest blindly in a coarse manner. If a target 44 (e.g. an aircraft) is within the broad beam, the target 44 will reflect the incoming probe beam. The returned signal from the target 44 is detected, time-reversed and retransmitted by each TRM 12 synchronously at a pre-designated prf (pulse repetition frequency). The retransmitted signals from the DTRMA 10 are coherently summed on the target 44, regardless of intermediate distortion. The retro-directive adaptive beam focusing on the target 44 will continue as the target 44 moves within the field of regard. This allows continuous tracking of a moving target 44. The focused beam on the target 44 can be recollected by the TRMs 12 and combined for further processing or imaging purposes. In this case, one should note that the TRM 12 has a phase information to coherently focus a beam on the target 44 through the distorting media. One example of such a time reversal-based high resolution imaging is described in U.S. Pat. No. 7,535,409, "Imaging Radar Method and System", Choe et al., issued May 19, 2009, and incorporated herein by reference.

It should be noted that the computer-generated time-reversed signal can be generated by executing one or more sequences of one or more computer-readable instructions read into a memory of the computer from volatile or non-volatile computer-readable media capable of storing and/or transferring computer programs or computer-readable instructions for execution by the computer. Volatile computer readable media that can be used can include a compact disk, hard disk, floppy disk, tape, magneto-optical disk. PROM (EPROM, EEPROM, flash EPROM). DRAM, SRAM, SDRAM, or any other magnetic medium: punch card, paper tape, or any other physical medium. Non-volatile media can include a memory such as a dynamic memory in a computer. In addition, computer readable media that can be used to store and/or transmit instructions for carrying out methods described herein can include non-physical media such as an electromagnetic carrier wave, acoustic wave, or light wave such as those generated during radio wave and infrared data communications.

EXAMPLES

To demonstrate time reversal for a DTRMA 10, three time-reversal mirrors (TRMs) 12 were constructed as shown in FIG. 2 and set up on the roof of a four-story building. Each TRM 12 was connected with a respective HF vertical antenna 42 and a GPS unit 16. The components and instruments in each TRM 12 is tabulated in Table 1, below. All components were commercially available off-the-shelf products. These instruments were remotely controlled by MatLab or Labview codes through USB cables. Special care was taken to ensure that each TRM 12 was totally separate and independent without any RF cable connections among TRMs—a key feature of the DTRMA 10.

All the instruments (AWG, oscilloscope, precision synthesized clock generator and delay generator) in each TRM were phase-locked by the 10 MHz reference time base from their local GPS-disciplined Rubidium oscillator.

A 10 KHz TTL signal generated by the local frequency synthesizer was used to trigger all the instruments.

TABLE 1

Components and instruments used in a TRM.

| Function | Model No. |
|---|---|
| Frequency | HF, around 15 MHz |
| Arbitrary waveform generator | Tektronix, AFG3022B |
| Oscilloscope | Tektronix, DPO4104 |
| Clock | SRS, Rubidium clock, FS725 or PRS100 |
| GPS Receiver | Trimble, ThunderBolt E |
| Antenna | Vertical antenna (from GAP, Hustler or YAESU) or a horizontal folded dipole (NVIS from B&W) |
| Delay Generator | SRS, Digital delay generator, DG645/535 |
| Trigger signal generator | SRS, CG635, 2.05 GHz Synthesized Clock Generator |
| Band Pass Filter | Spruce Creek, Digital Tunable Filter, HDP-2-4-16 |
| High power amplifier | Ar, KAA1075 |
| PC | Laptop computers from Fujitsu, Toshiba, Dell |
| LAN connection | NetGear Switch box through LAN cable |
| Instrument control | Mostly USB cables with MatLab or LabView |

All these are COTS products.

I. Temporal Focusing Using a DTRMA 10

The temporal focusing feature of time-reversal of the DTRMA 10 was tested for both a short pulse and a chirp signal, as follows:

A. Temporal Focusing of a Pulse

Figure 4A:
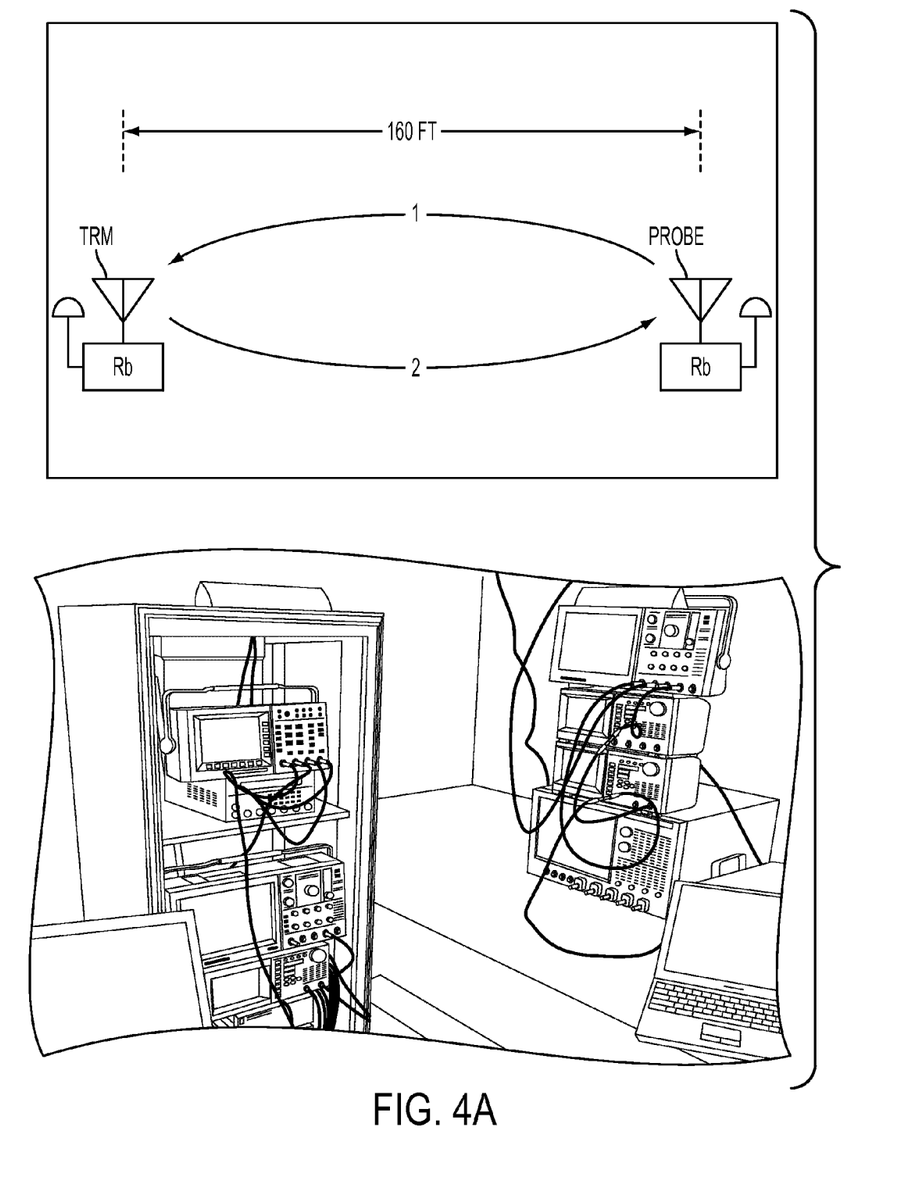
FIG. 4 shows the temporal focusing of a pulse using the DTRMA according to the invention.

FIG. 4A shows a schematic diagram (top left) and a picture (bottom left) of the setup to demonstrate temporal focusing with the DTRMA 10. A short pulse from one of the TRMs 12 (called Probe station) was propagated through free-space (shown with arrow "1"), and received by the second TRM 12 separated from the Probe by 160 feet. The TRM time-reversed the received signal and re-transmitted through the air (shown with arrow "2"). The short pulse was distorted by the environmental RF noise. In this experiment, a band-pass filter was not used.

Figure 4B:
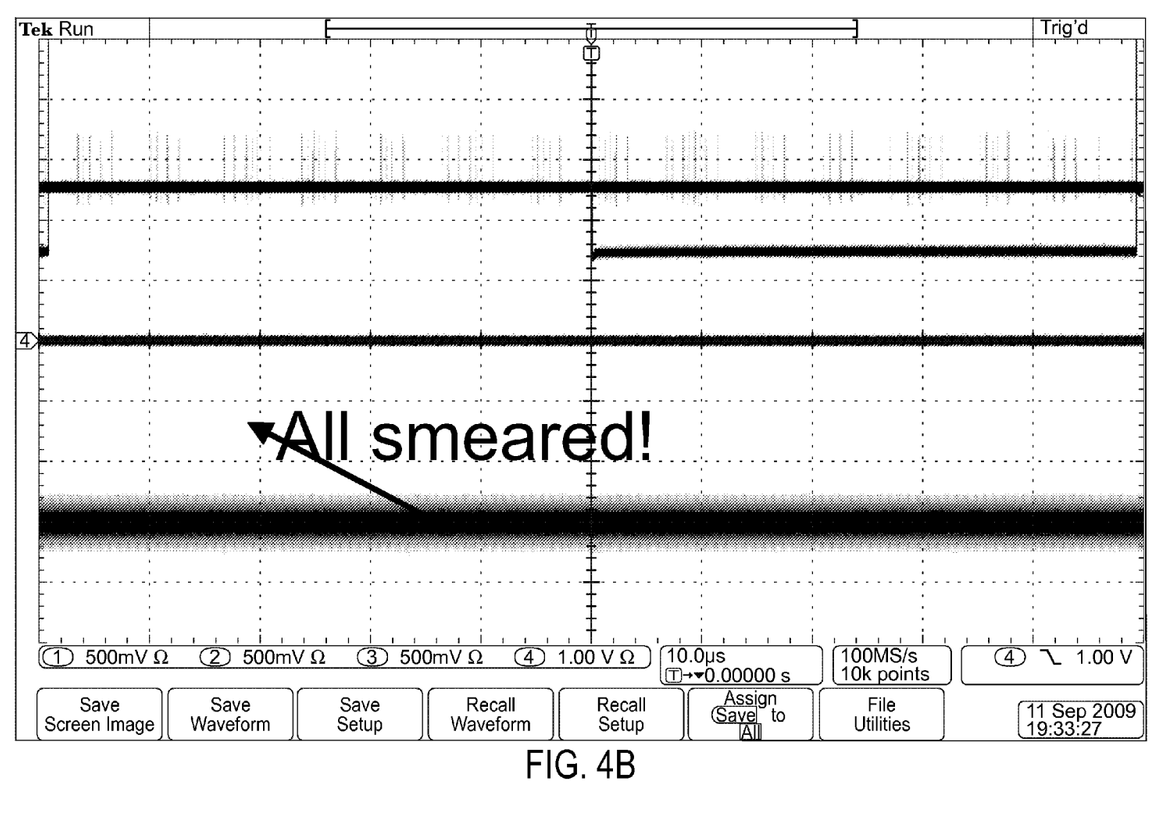

FIG. 4B shows the received signal without using a GPS-disciplined Rubidium clock. The 10 MHz signal from the AWG was used to phase-lock all the other instruments locally. In the figure, the initially transmitted pulse from the Probe (yellow curve) and the time-reversed returned signal (pink curve) are shown. As expected, the correlation output is severely smeared because the two TRMs are not phase-locked with each other.

Figure 4C:
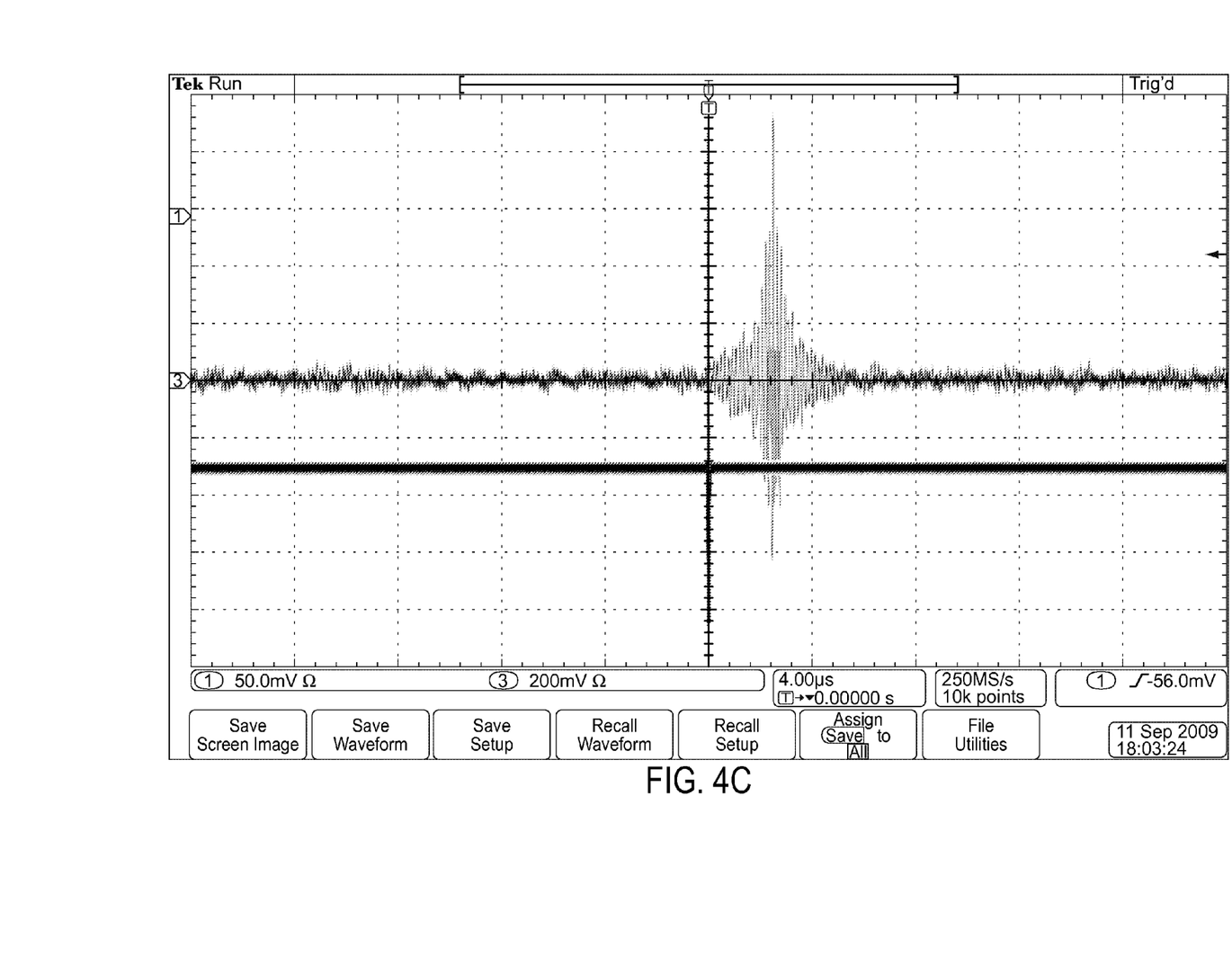

FIG. 4C shows the received signal when employing a GPS-disciplined Rubidium clock. One can see that the signal is stable and sharply focused in spite of the serious atmospheric noise, and overall shape is symmetrical.

B. Temporal Focusing of a Chirp Signal Using DTRMA

Temporal focusing was also tested with a chirp signal. In this case, due to the processing gain provided by the pulse compression of a chirp, signal strength can be increased with a sharper peak.

A chirp signal ranging 11-13 MHz was transmitted from Probe station, and the time-reversal returning signal was convolved (instead of correlation because the returning signal is reversed) with the original transmitted chirp signal.

Figure 5A:
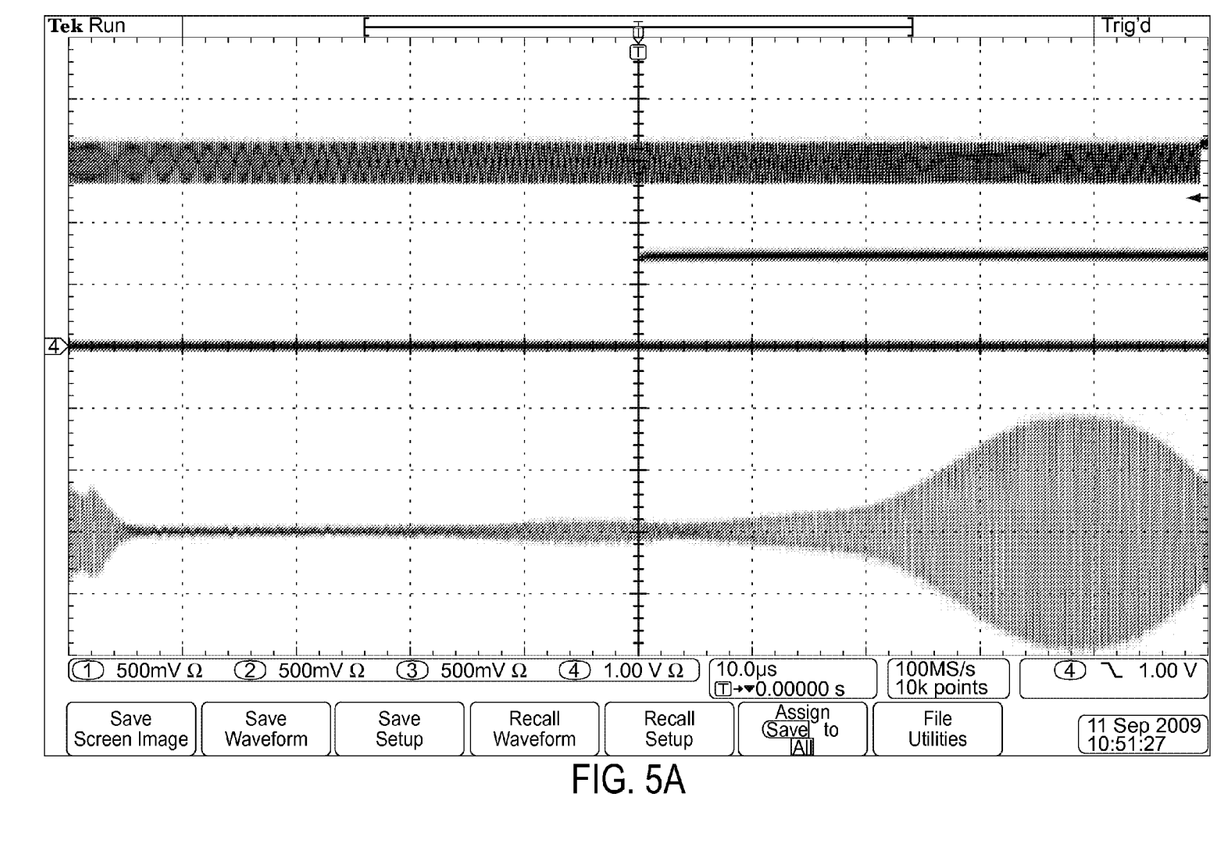
FIG. 5 shows the temporal focusing of a chirp signal using the DTRMA according to the invention.

FIG. 5A shows the initially transmitted chirp signal, trigger signal, and the time-reversed received signal. One can see that the amplitude of the returning signal is not uniform. Such a non-uniform frequency response is mainly attributed to the limited frequency response of the resonant antennas.

Figure 5B:
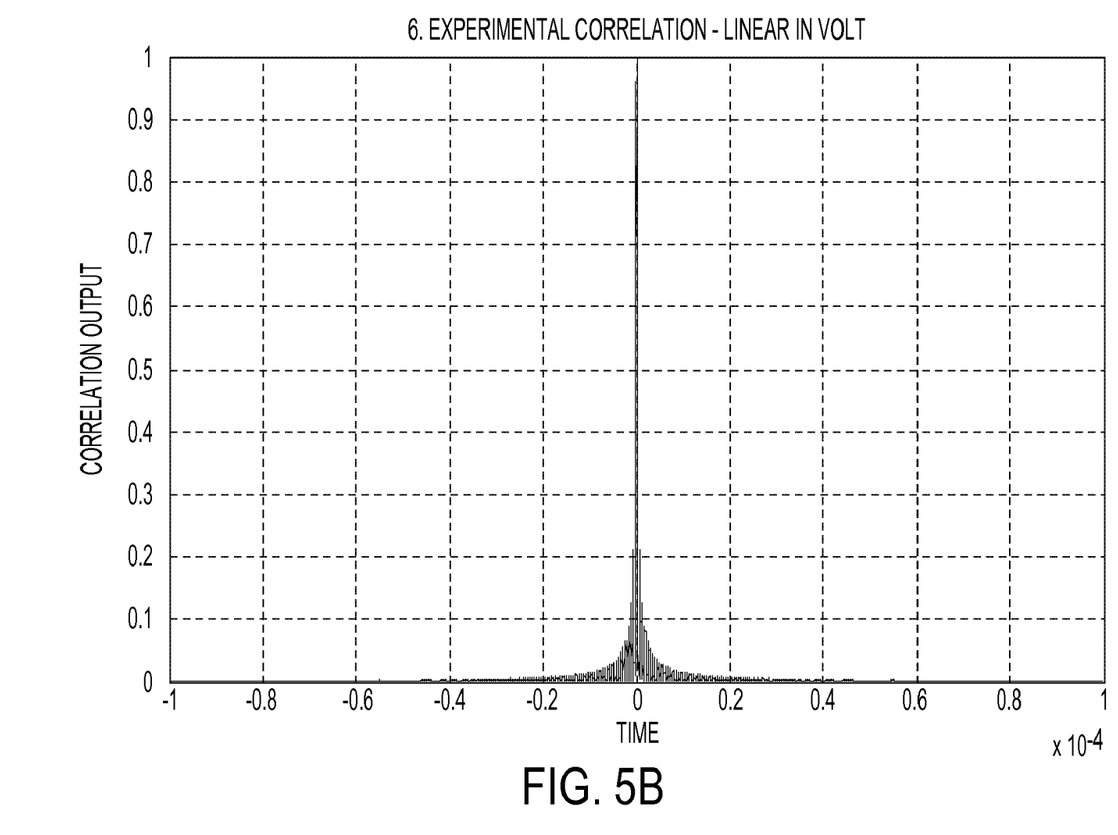

FIG. 5B shows a calculated autocorrelation of the original chirp signal for comparison.

Figure 5C:
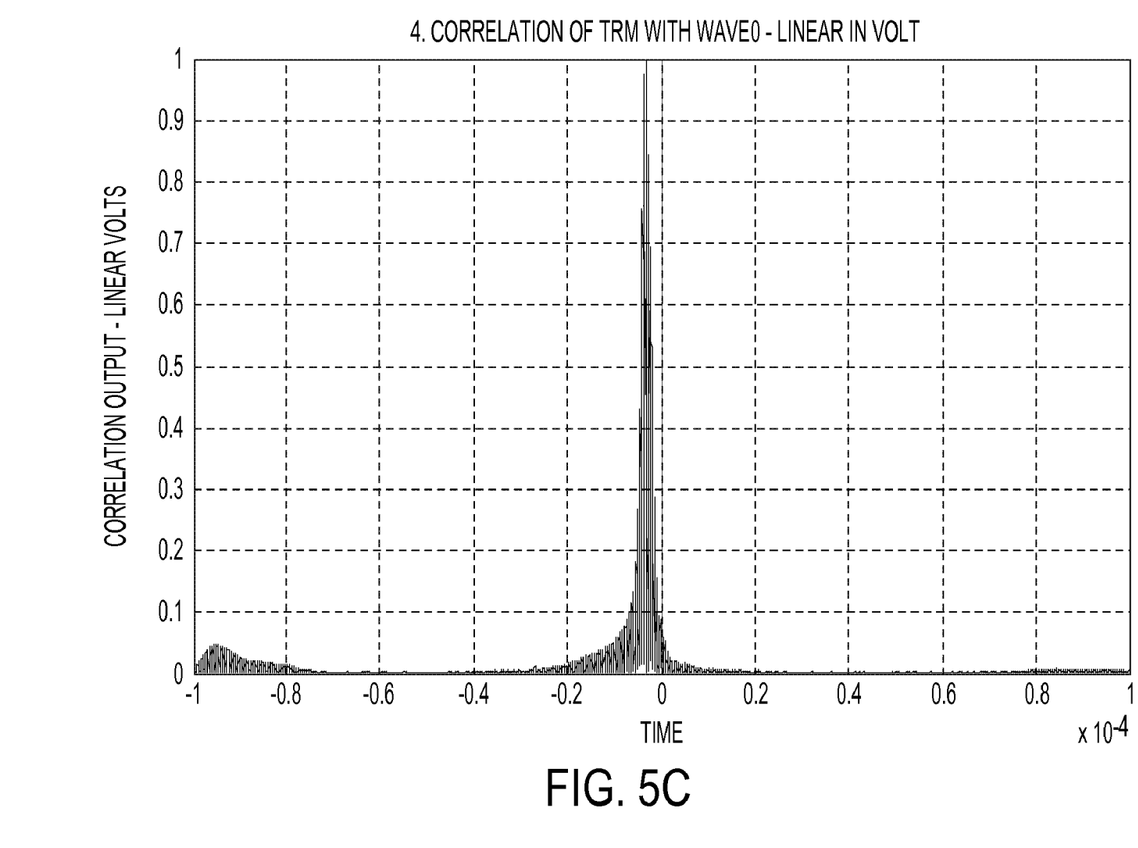

FIG. 5C shows the experimental convolution output of the returned time-reversed signal with the original chirp. A stable sharp peak is obtained and the location of the peak does not change for each run. A little broadening of the peak (compared with theoretical results in FIG. 5B) is expected because of the narrowing effect of the received signal as shown in FIG. 5A. Also, a sidelobe on the left corner is due to the time skew between the trigger signals of the two TRMs.

Figure 5D:
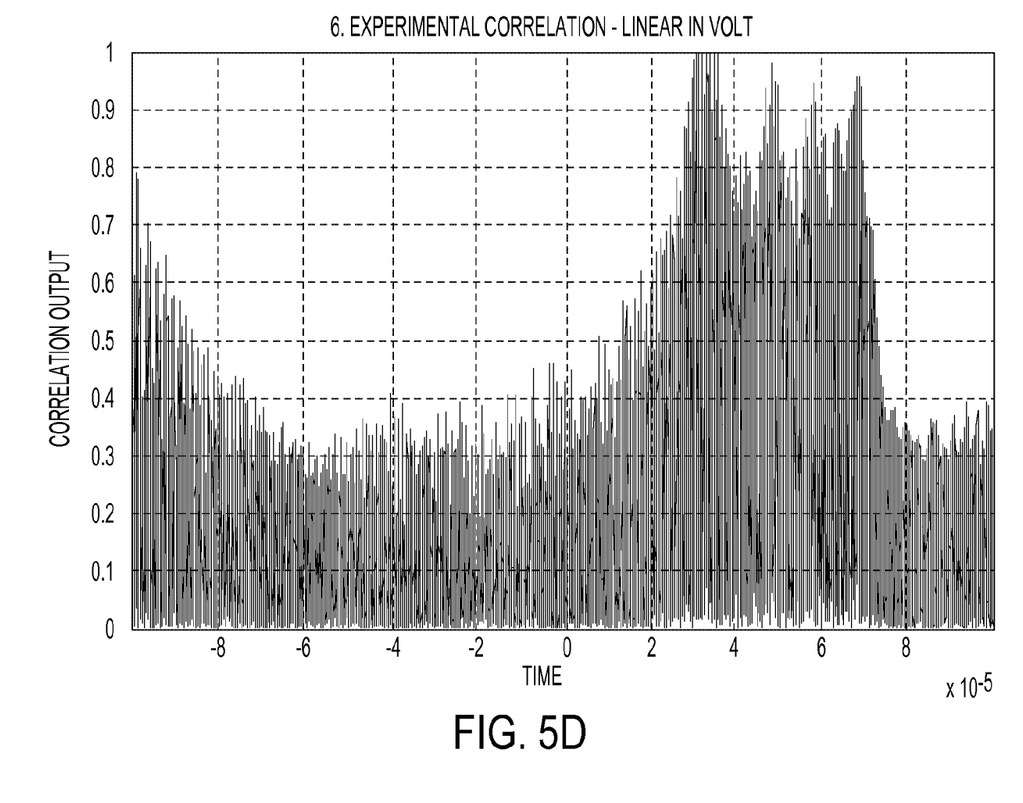

FIG. 5D shows the same experimental convolution when instruments are phase-locked by their local 10 MHz time-base reference from the local AWG, instead of GPS-disciplined Rubidium clock. The signal is widely spread without any focusing effect. Also, each run shows different convolution output because the time delay between the two trigger signals of the TRMs are not synchronized.

Spatial Focusing Using a DTRMA

Figure 6A:
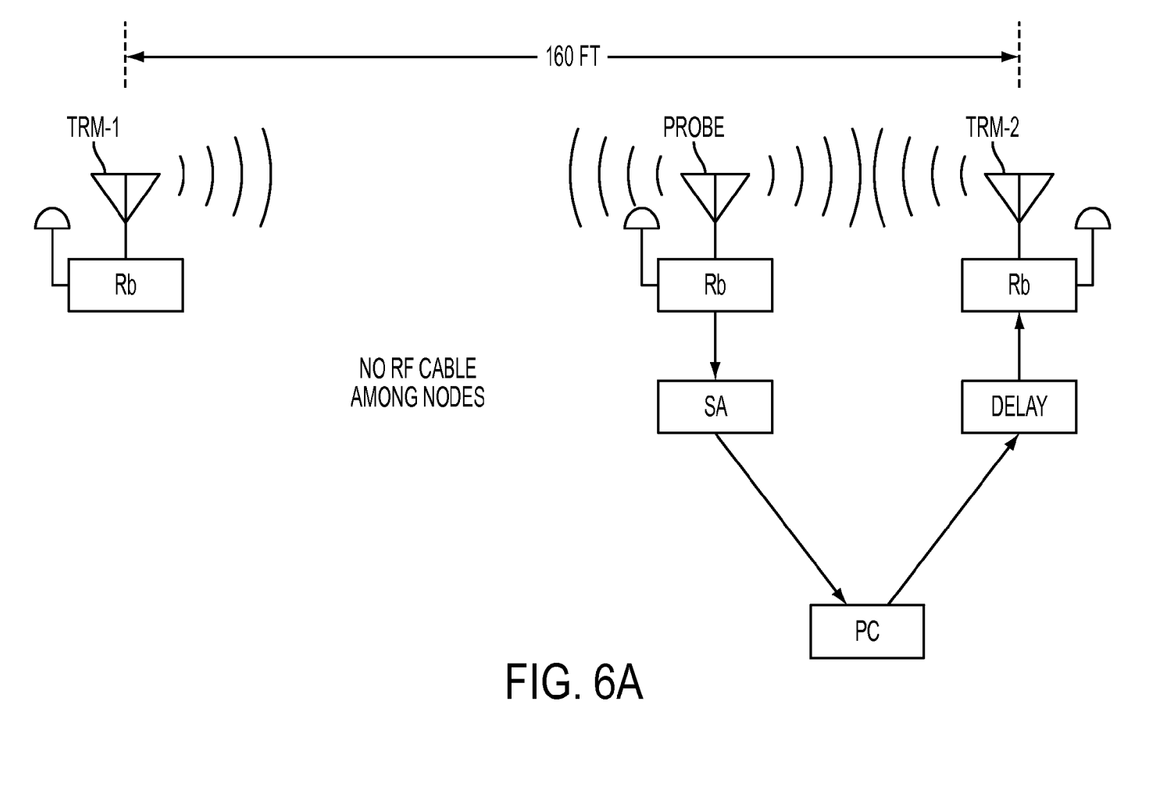
FIG. 6 shows spatial focusing the DTRMA according to the invention.

To demonstrate spatial focusing of a DTRMA 10, three TRW's were used—one for Probe and two for TRM's, as shown in FIG. 6A. A siunoidal signal from the Probe station was transmitted through an antenna and was detected by the two antennas of the TRM's. The time-reversed signal from both TRM's was detected by the Probe. One can scan the self-focused signal by moving the antennas in around the original Probe location. However, such a spatial scanning requires a movement of a large antenna over the long distance, which is normally difficult for HF cases. So, in this proof-of-concept experiment, the trigger singal of one of the TRMs was delayed by using a digital delay generator. The digital delay generator (SRS, DG535) provided a very precise delay of a TTL signal with a 5 ps resolution and <25 ps rms jitter. The signal strength was measured as a function of the time delay.

Figure 6B:
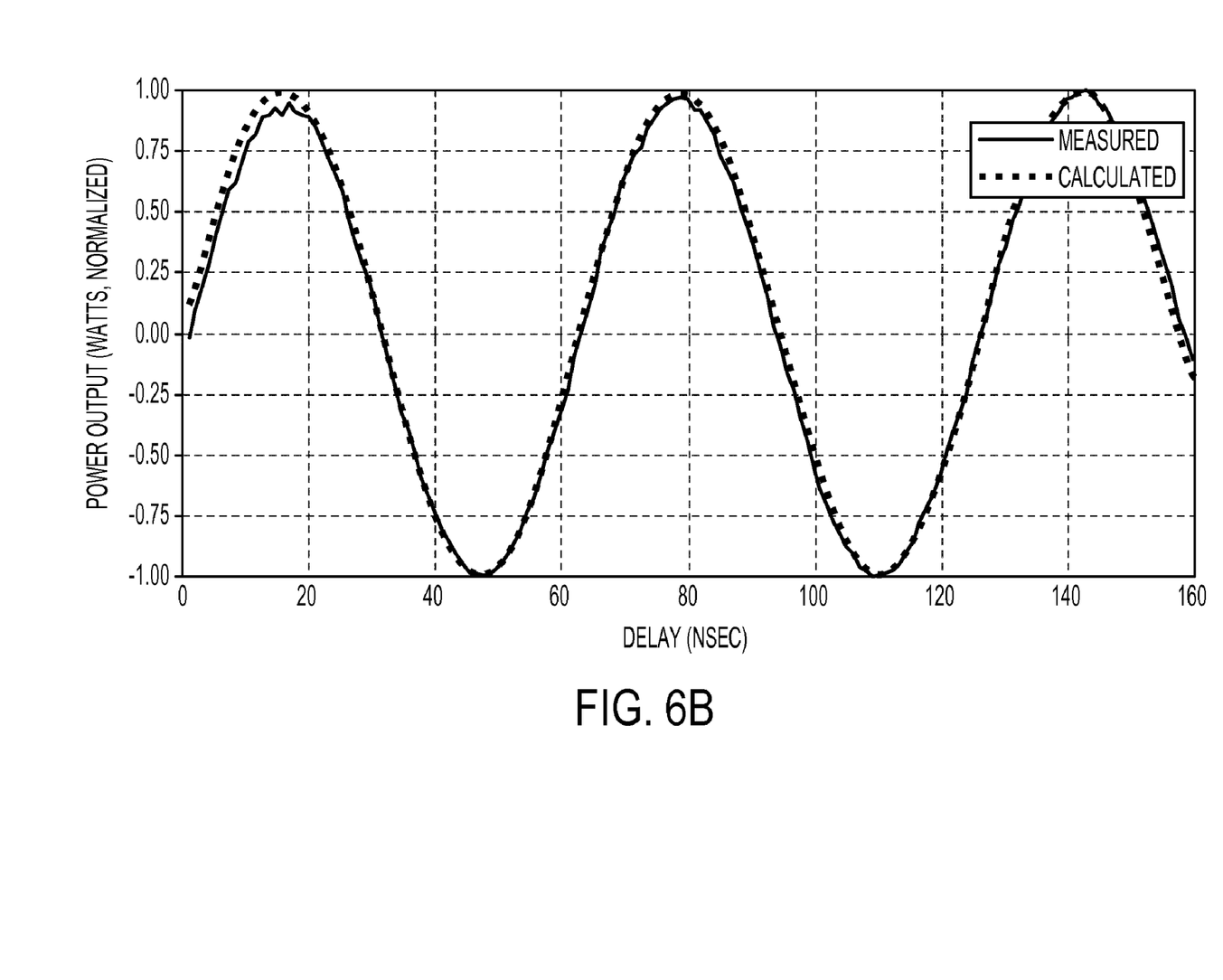

FIG. 6B shows the signal strength from the two TRM's received at the Probe location as a function of the relative time delay between the trigger signals of the two TRMs. The dotted curve shows the expected theoretical sinusoidal curve and solid curve shows the experimental results. One can see that the experimental results fit the theoretical curve excellently and repetitively, verifying a perfect coherence and synchronization of the two separate TRMs.

Figure 6C:
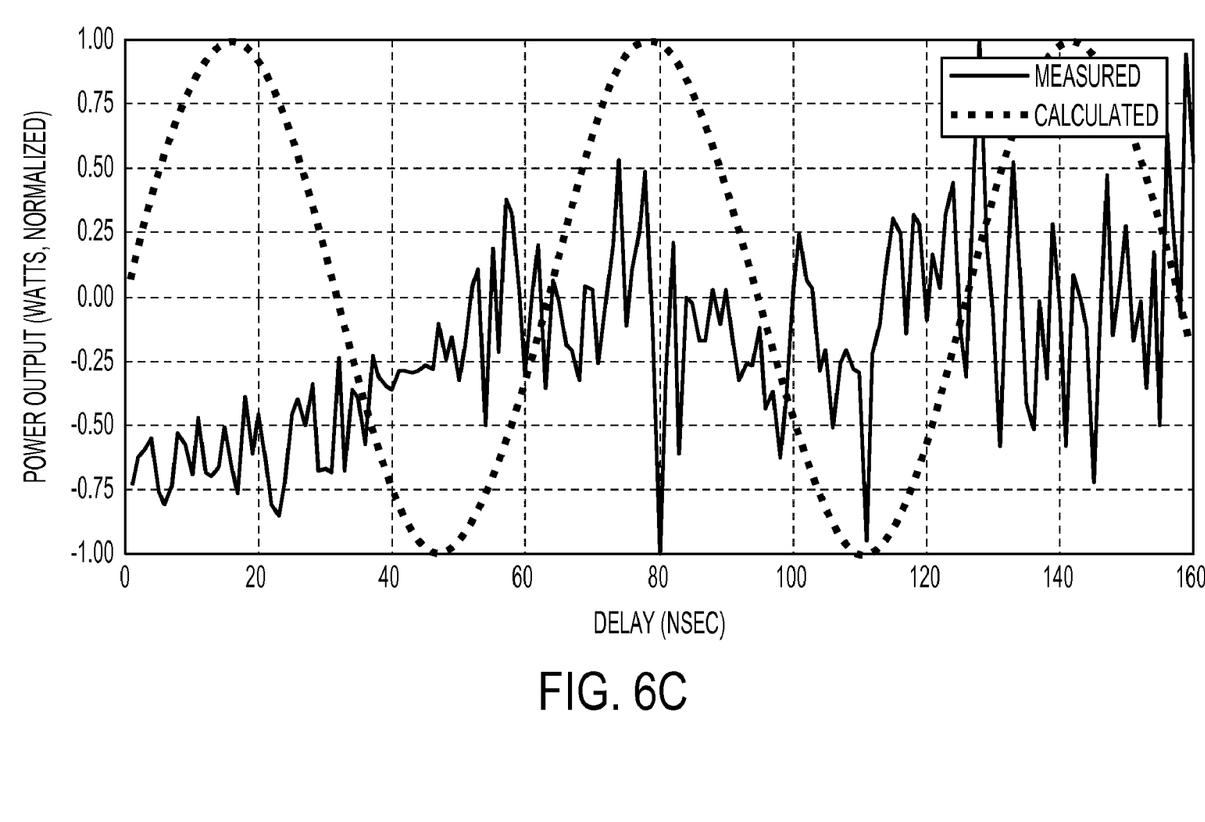

FIG. 6C is the result obtained when the Rubidium clock was disconnected and the 10 MHz time base signal from the local AWG was used to phase-lock all the local instruments, the signal strength no more follows the theoretical sinusoidal curve and is not reproducible.

Obviously many modifications and variations of the present invention are possible in the light of the above teachings. For example, to increase the precision further, conventional techniques such as closure phase, pseudo range, or time integration methods may be employed in this system. To support multiple nodes without crosstalk, an array of TRM's may be used to selectively focus the beam on the desired node. The TRM in FIG. 2 may be integrated into a compact box using FPGA and DSP chips.

Regarding diverse waveforms, time-reversal can accommodate arbitrary waveforms within the bandwidth of the TRM comprised of an antenna, amplifiers, filters, etc. Also, filtering and processing can be applied to selectively enhance certain frequency components or waveforms. Furthermore, more elaborate algorithms such as DORT or MUSIC can be incorporated. For synthesis of a large aperture. TRMs can be distributed over a large area without having to worry about cable connections among sensor nodes or the loss of coherence (phase noise) due to the thermal expansion or mechanical disturbances applied to the cables. As a result, coherent synthesis of a large aperture that provides high resolution and high signal-to-clutter noise can be achieved.

The invention can have a 2D or 3D configuration, as the time-reversal feature of the DTRMA allows adaptive alignment of phases to focus beam on a target. Therefore, unlike the conventional phased array antennas with regular spacing, the location of each element can be arbitrary. This adaptive feature allows distribution of TRMs in a 2D or 3D arrangement conformal to the geographic surface profile. Range resolution due to 2D/3D distribution without having to use broadband signals: In conventional radars, range resolution is determined by the bandwidth of the signal. The 2D/3D arrangement of the DTRMA allows improvement in range resolution even with narrowband signals when it is used with an ionospheric mirror as in OTHR cases. One should note that simple extended arrangement along the range direction on the ground does not provide increased aspect angle and thus improved range resolution, without the aid of the ionospheric mirror inversion High resolution imaging by multipath-enabled extended virtual aperture using time reversal, as is described in U.S. Pat. No. 7,535,409, supra. For network connection, the individual TRM may be connected to a large-scale digital network through a wireless network such as WiMAX or WiBRO to distribute commands (e.g. initial coarse beam steering or calibration) or transmission of already-processed digital signals. One should note that this connection does not require coherence (phase alignment and synchronization), unlike with other signal distribution methods over WiMAX in which transmission channel must preserve coherence among signals from different sensors.

The invention also provides for compact integration, in that the demonstrated proof-of-concept system described above using COTS components and instruments may be further integrated into a more compact, lightweight and low-cost box with FPGA+DSP and other new chips (ADC, DAC, amplifiers, filters, etc.).

The invention can be applied to the coherent integration of signals from distributed amateur HAM radios after the modification to allow external time-base from a GPS-disciplined Rb clock and subsequent triggering signal generation by a stable frequency synthesizer.

It is therefore to be understood that the scope of the invention should be determined by referring to the following appended claims.

What is claimed as new and desired to be protected by Letters Patent of the United States is:

1. A distributed time reversal mirror array (DTRMA) system, comprising:
    a plurality of independent, sparsely distributed time reversal mirrors (TRMs), wherein each TRM comprises:
    an antenna:
    a transceiver connected to the antenna for transmitting a signal toward a target, for receiving a return, reflected signal from the target, and for retransmitting a time-reversed signal toward the target:
    means for phase-locking and for maintaining spatial and temporal coherences between the TRMs; and
    a computer including a machine-readable storage media having programmed instructions stored thereon for computing and generating the time-reversed retransmitted signal, thereby providing a phased array functionality for the DTRMA while minimizing distortion from external sources.

2. The DTRMA system of claim 1, wherein:
    each means for phase-locking and for maintaining spatial and temporal coherences between the TRMs comprises a clock circuit.

3. The DTRMA system of claim 1, wherein:
    each means for phase-locking and for maintaining spatial and temporal coherences between the TRMs comprises:
        a GPS unit;
        a Rubidium clock;
        a clock generator, and
        a delay generator; and
    each transceiver comprises:
        an arbitrary waveform generator;
        an oscilloscope;
        a duplexer;
        a high power amplifier;
        a low noise amplifier; and
        a bandpass filter.

4. The TT TRM system of claim 1, wherein the signal is a multistatic radar signal.

5. The TT TRM system of claim 1, wherein the target is an aircraft.

* * * * *